(12) United States Patent
Aizawa et al.

(10) Patent No.: US 11,207,755 B2
(45) Date of Patent: Dec. 28, 2021

(54) DETECTION DEVICE AND STORAGE MEDIUM STORING A PROGRAM

(71) Applicant: FANUC CORPORATION, Yamanashi (JP)

(72) Inventors: Nobuaki Aizawa, Yamanashi (JP); Hiroyuki Fujimoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/021,850

(22) Filed: Sep. 15, 2020

(65) Prior Publication Data
US 2021/0107108 A1    Apr. 15, 2021

(30) Foreign Application Priority Data
Oct. 11, 2019    (JP) .............................. JP2019-188034

(51) Int. Cl.
*B23Q 15/013* (2006.01)
*B23Q 17/09* (2006.01)

(52) U.S. Cl.
CPC ....... *B23Q 15/013* (2013.01); *B23Q 17/0966* (2013.01); *B23Q 2717/006* (2013.01)

(58) Field of Classification Search
None
See application file for complete search history.

(56) References Cited

FOREIGN PATENT DOCUMENTS

JP    H08-019939 A    1/1996
JP    10286743 A  *  10/1998

OTHER PUBLICATIONS

Machine Translation of JPH10286743A (Year: 1998).*

* cited by examiner

*Primary Examiner* — Ryan A Jarrett
(74) *Attorney, Agent, or Firm* — Studebaker & Bracket PC

(57) ABSTRACT

A detection device includes an idling feed threshold acquiring unit configured to acquire, as an idling feed threshold, a threshold of an acceptable load in an idling feed operation; an expected load acquiring unit configured to acquire, as an expected load, an expected increase in load due to execution of an actual machining operation; a calculating unit configured to calculate, based on the idling feed threshold and the expected load, an actual machining threshold which is a threshold of an acceptable load in the actual machining operation; an actual machining load acquiring unit configured to acquire, as an actual machining load, an actual load during an actual machining operation; and a detecting unit configured to detect, based on the operating mode, an excess of the actual machining load relative to the idling feed threshold or the actual machining threshold.

4 Claims, 9 Drawing Sheets

FIG. 6

| EXPECTED LOAD | | SMALL ↔ GREAT | REMARKS |
|---|---|---|---|
| WORKPIECE MATERIAL | HARDNESS | SOFT ↔ HARD | |
| | TENSILE STRENGTH | WEAK ↔ STRONG | |
| MACHINING CONDITIONS | FEED RATE | SLOW ↔ FAST | THE HIGHER THE FEED RATE, THE GREATER THE REMOVAL MACHINING AMOUNT WITH EACH BLADE STRIKE, AND THE GREATER THE LOAD. |
| | DEPTH OF CUT | SMALL ↔ GREAT | THE GREATER THE DEPTH OF CUT AND REMOVAL MACHINING WIDTH, THE GREATER THE REMOVAL MACHINING AMOUNT, AND THE GREATER THE LOAD. |
| | REMOVAL MACHINING WIDTH | SMALL ↔ GREAT | |
| | CUTTING SPEED | FAST ↔ SLOW | THE SLOWER THE CUTTING SPEED, THE GREATER THE REMOVAL MACHINING AMOUNT WITH EACH BLADE STRIKE, AND THE GREATER THE LOAD. |
| TOOL SHAPE | ENTERING ANGLE | GREAT ↔ SMALL | THE SMALLER THE ENTERING ANGLE, THE GREATER THE REMOVAL MACHINING AMOUNT WITH EACH BLADE STRIKE, AND THE GREATER THE LOAD. |

DETECTION DEVICE AND STORAGE MEDIUM STORING A PROGRAM

This application is based on and claims the benefit of priority from Japanese Patent Application No. 2019-188034, filed on 11 Oct. 2019, the content of which is incorporated herein by reference.

BACKGROUND OF THE INVENTION

Field of the Invention

The present invention relates to a detection device and a storage medium storing a program.

Related Art

Conventionally, in removal machining devices that perform removal machining such as cutting using a tool, machining of a workpiece is carried out by bringing the tool into contact with the workpiece. At this time, the tool is moved (fed) by an operation of a worker, or a program set in the removal machining device.

When operating a removal machining tool, the main axis of the moving tool preferably does not contact the workpiece or jig. Such contact may cause damage to the tool (and the removal machining device). Therefore, measures are taken to prevent damage, by detecting a load on the feed axis (main axis). For example, when a load torque equal to or more than a threshold is detected on the feed axis, operation of the removal machining device is stopped. In this way, a device that compares an upper limit of the machining load to an actual load has been proposed as a device for monitoring a load (see, for example, Japanese Unexamined Patent Application, Publication No. H08-19939).

Patent Document 1: Japanese Unexamined Patent Application, Publication No. H08-19939

SUMMARY OF THE INVENTION

In Japanese Unexamined Patent Application, Publication No. H08-19939, it is determined whether an actual load exceeds a preset upper limit of the machining load. This allows for monitoring of breakage and wear of the tool.

The threshold for detecting the load is set to a value that includes a margin considering the influence of a load due to removal machining. This makes it possible to prevent stopping due to the load at the time of removal machining. However, detection of the load by the threshold including the margin of the removal machining load is carried out even in cases where no removal machining takes place (idling operation), such as when testing the program with the tool separated from the workpiece. It would therefore be preferable if it were possible to prevent damage to the tool in a more suitable manner according to the operating conditions.

The present disclosure relates to a detection device to detect an abnormality in a removal machining load on a feed axis in a removal machining feed by a removal machining device, the detection device including: an idling feed threshold acquiring unit that acquires, as an idling feed threshold, a threshold of an acceptable load in an idling feed operation where a workpiece is not machined; an expected load acquiring unit that acquires, as an expected load, an expected increase in load due to execution of an actual machining operation in which the workpiece is actually machined; a calculating unit that calculates, based on the idling feed threshold and the expected load, an actual machining threshold which is a threshold of an acceptable load in the actual machining operation; an operating mode acquiring unit that acquires whether the operating mode is an idling feed operation or an actual machining operation; an actual machining load acquiring unit that acquires, as an actual machining load, an actual load during an actual machining operation; a detecting unit that detects, based on the operating mode, an excess of the actual machining load relative to the idling feed threshold or the actual machining threshold; and an output unit that outputs a signal indicating the excess of the actual machining load.

In addition, the present disclosure relates to a storage medium storing a program to cause a computer to operate as a detection device to detect an abnormality in a removal machining load on a feed axis in a removal machining feed by a removal machining device, the program causing the computer to function as: an idling feed threshold acquiring unit that acquires, as an idling feed threshold, a threshold of an acceptable load in an idling feed operation where a workpiece is not machined; an expected load acquiring unit that acquires, as an expected load, an expected increase in load due to execution of an actual machining operation in which the workpiece is actually machined; a calculating unit that calculates, based on the idling feed threshold and the expected load, an actual machining threshold which is a threshold of an acceptable load in the actual machining operation; an operating mode acquiring unit that acquires whether the operating mode is an idling feed operation or an actual machining operation; an actual machining load acquiring unit that acquires, as an actual machining load, an actual load during an actual machining operation; a detecting unit that detects, based on the operating mode, an excess of the actual machining load relative to the idling feed threshold or the actual machining threshold; and an output unit that outputs a signal indicating the excess of the actual machining load.

According to the present disclosure, a detection device and storage medium storing a program that more appropriately prevents damage to a tool according to operating conditions can be provided.

BRIEF DESCRIPTION OF THE DRAWINGS

FIG. 6 is a chart showing elements for determining an expected load of the detection device according to the second embodiment;

DETAILED DESCRIPTION OF THE INVENTION

The detection device 1 and program according to each of the embodiments of the present disclosure are described below with reference to FIGS. 1 to 9. First, the detection device 1 will be summarized.

Figure 1:
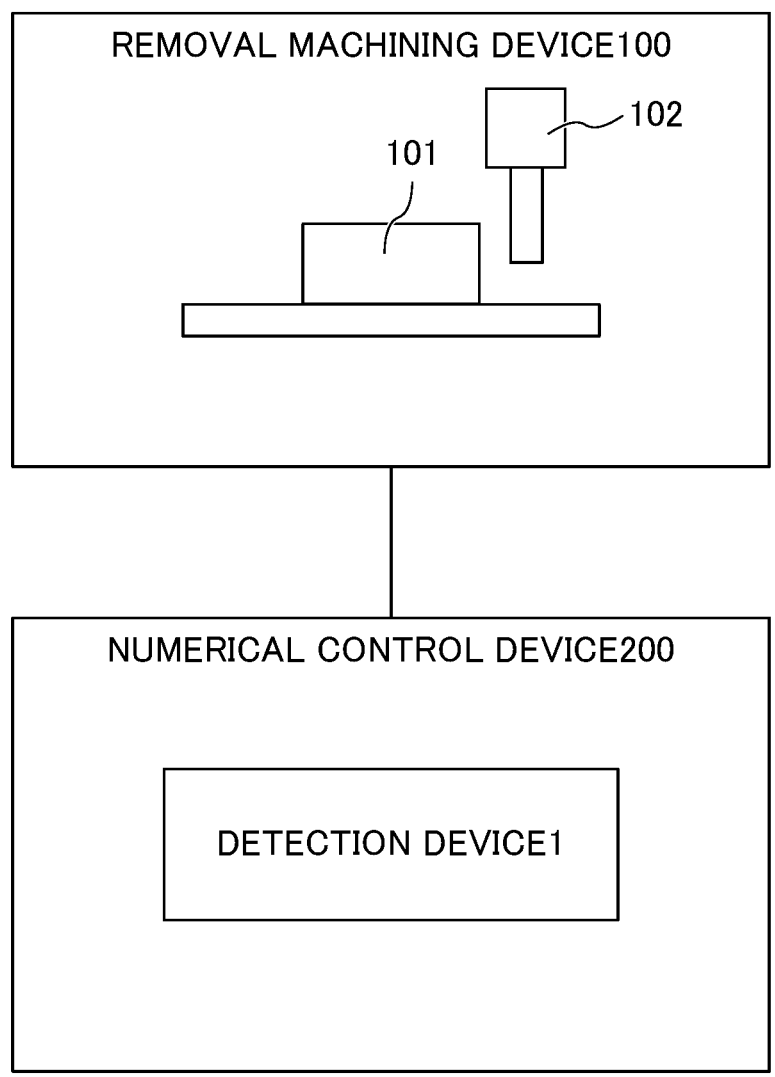
FIG. 1 is a schematic structural diagram showing a detection device and a removal machining device according to a first embodiment of the present disclosure.

The detection device 1 is, for example, incorporated into a numerical control device 200 that controls a removal machining device 100, as shown in FIG. 1. The detection device 1 monitors a load on a feed axis (main axis) of the removal machining device 100. The detection device 1 acquires, for example, a load torque or load current on the feed axis caused by a movement of the tool 102, in order to detect contact of the tool 102 against the workpiece 101 or jig (not shown). The detection device 1 thus prevents breakage, damage, etc. of the tool 102. The detection device 1 according to each of the embodiments below particularly monitors the load of a removal machining feed of the tool 102. Specifically, the detection device 1 monitors load in an idling feed operation where the workpiece 101 is not machined, and an actual machining operation where the workpiece 101 is actually machined. It should be noted that in each of the embodiments, "removal machining" is a general term for a type of machining in which a tool contacts a workpiece, including cutting, grinding, polishing, etc.

First Embodiment

Figure 2:
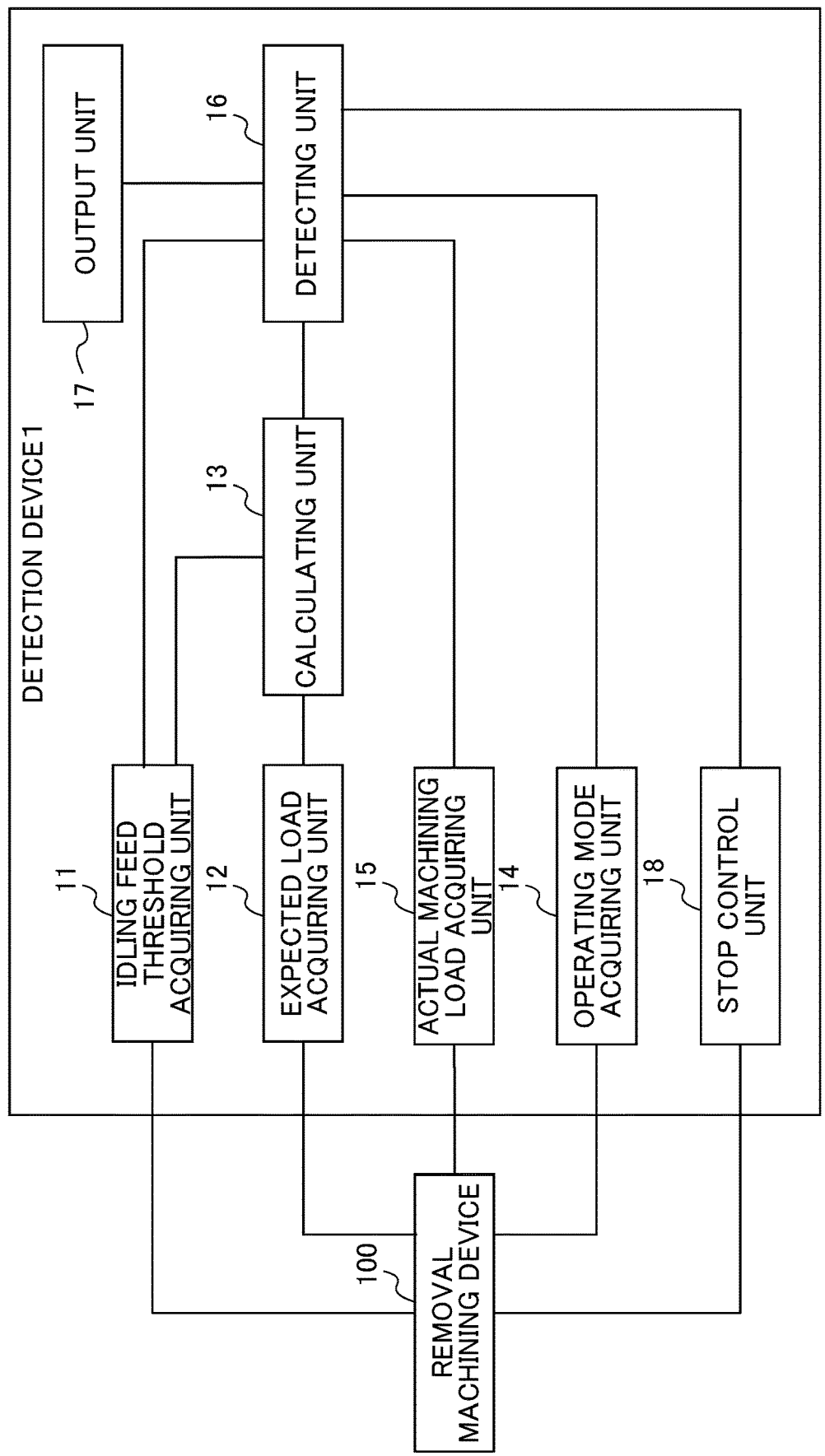
FIG. 2 is a block diagram showing a configuration of the detection device according to the first embodiment.

Next, a detection device 1 according to a first embodiment of the present disclosure will be described with reference to FIGS. 1 to 4. The detection device 1 is a device for detecting a removal machining load abnormality in a removal machining feed operation of a removal machining device 100. As shown in FIG. 2, the detection device 1 includes an idling feed threshold acquiring unit 11, an expected load acquiring unit 12, a calculating unit 13, an operating mode acquiring unit 14, an actual machining load acquiring unit 15, a detecting unit 16, an output unit 17, and a stop control unit 18.

The idling feed threshold acquiring unit 11 is realized, for example, by the operation of a CPU. The idling feed threshold acquiring unit 11 acquires, as an idling feed threshold, a threshold of an acceptable load in an idling feed operation where the workpiece 101 is not machined. For example, the idling feed threshold acquiring unit 11 acquires, as the idling feed threshold, the load on the feed axis in a test operation for testing an operation of the tool 102. The idling feed threshold acquiring unit 11 acquires a smaller load as the idling feed threshold, on the premise that the tool 102 is not in contact with the workpiece 101.

The expected load acquiring unit 12 is realized, for example, by the operation of a CPU. The expected load acquiring unit 12 acquires, as an expected load, an expected increase in load due to the execution of an actual machining operation in which the workpiece 101 is actually machined. For example, the expected load acquiring unit 12 acquires, as the expected load, a value determined as the increase in load due to actual machining. In other words, the expected load acquiring unit 12 acquires an acceptable load margin beyond the idling feed threshold as the expected load.

Figure 3:
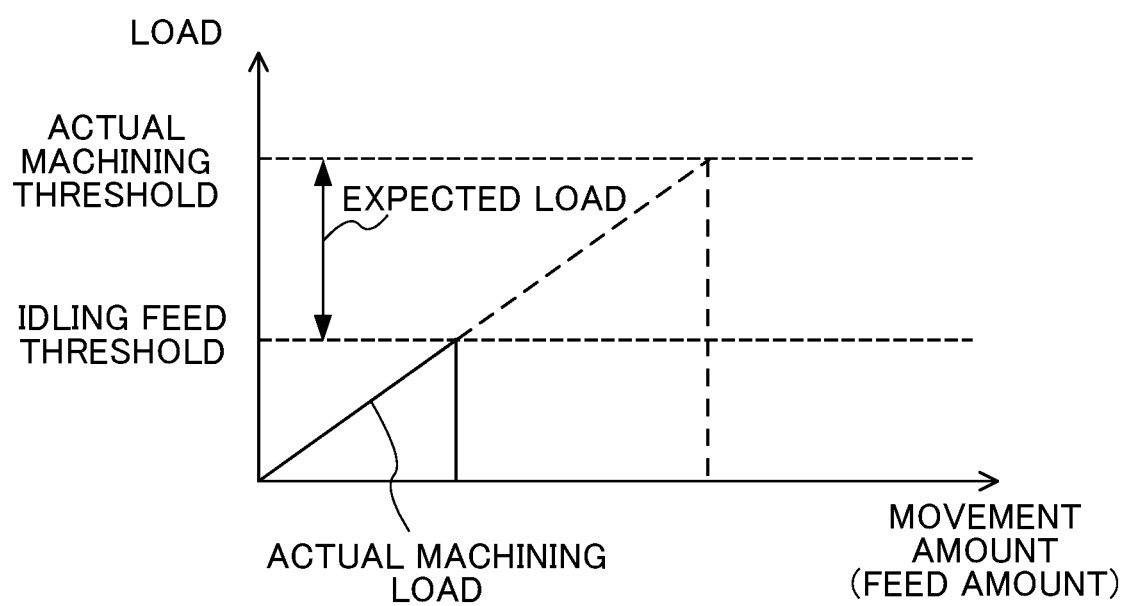
FIG. 3 is a graph showing a relationship of an actual machining load relative to an idling feed threshold and an actual machining threshold of the detection device according to the first embodiment.

The calculating unit 13 is realized, for example, by the operation of a CPU. The calculating unit 13 calculates, based on the idling feed threshold and the expected load, an actual machining threshold, which is a threshold of an acceptable load in the actual machining operation. For example, as shown in FIG. 3, the calculating unit 13 calculates the sum of the idling feed threshold and the expected load as the actual machining threshold.

The operating mode acquiring unit 14 is realized, for example, by the operation of a CPU. The operating mode acquiring unit 14 acquires whether the operating mode is an idling feed operation or an actual machining operation. For example, the operating mode acquiring unit 14 acquires an operating mode, which is either the idling feed operation or the actual machining operation set by the numerical control device 200.

The actual machining load acquiring unit 15 is realized, for example, by the operation of a CPU. The actual machining load acquiring unit 15 acquires an actual load during actual machining operation as the actual machining load. For example, the actual machining load acquiring unit 15 acquires from the numerical control device 200 the actual load on the tool 102, which changes over time as the actual machining load. In other words, the actual machining load acquiring unit 15 acquires an increased load due to contact of the tool 102 against the workpiece 101 as an example of the actual machining load. Conversely, the actual machining load acquiring unit 15 acquires a reduced load due to separation of the tool 102 from the workpiece 101 as an example of the actual machining load.

The detecting unit 16 is realized, for example, by the operation of a CPU. The detecting unit 16 detects, based on the operating mode, an excess of the actual machining load relative to the idling feed threshold or the actual machining threshold. In case the operating mode is set to the idling feed operation, the detecting unit 16 detects an excess of the actual machining load relative to the idling feed threshold. On the other hand, if the operating mode is set to the actual machining operation, the detecting unit 16 detects an excess of the actual machining load on the tool 102 relative to the actual machining threshold. In other words, if the operating mode is set to the idling feed operation, the detecting unit 16 detects an excess of the actual machining load relative to the idling feed threshold, which is the lower threshold. Conversely, in case the operating mode is set to the actual machining operation, the detecting unit 16 detects an excess of the actual machining load relative to the actual machining threshold, which is the higher threshold.

The output unit 17 is realized, for example, by the operation of a CPU. The output unit 17 outputs a signal indicating an excess of the actual machining load. For example, the output unit 17 displays a screen showing the excess on a display device (not shown). In addition, the output unit 17 causes an audio playback device (not shown) such as, for example, a speaker, etc. to play a sound indicating the excess.

The stop control unit 18 is realized, for example, by the operation of a CPU. Based on a detection of the excess of the actual machining load, the stop control unit 18 stops operation of the removal machining device 100. For example, the stop control unit 18 stops operation of the removal machining device 100 by outputting a trip signal to the removal machining device 100.

Figure 4:
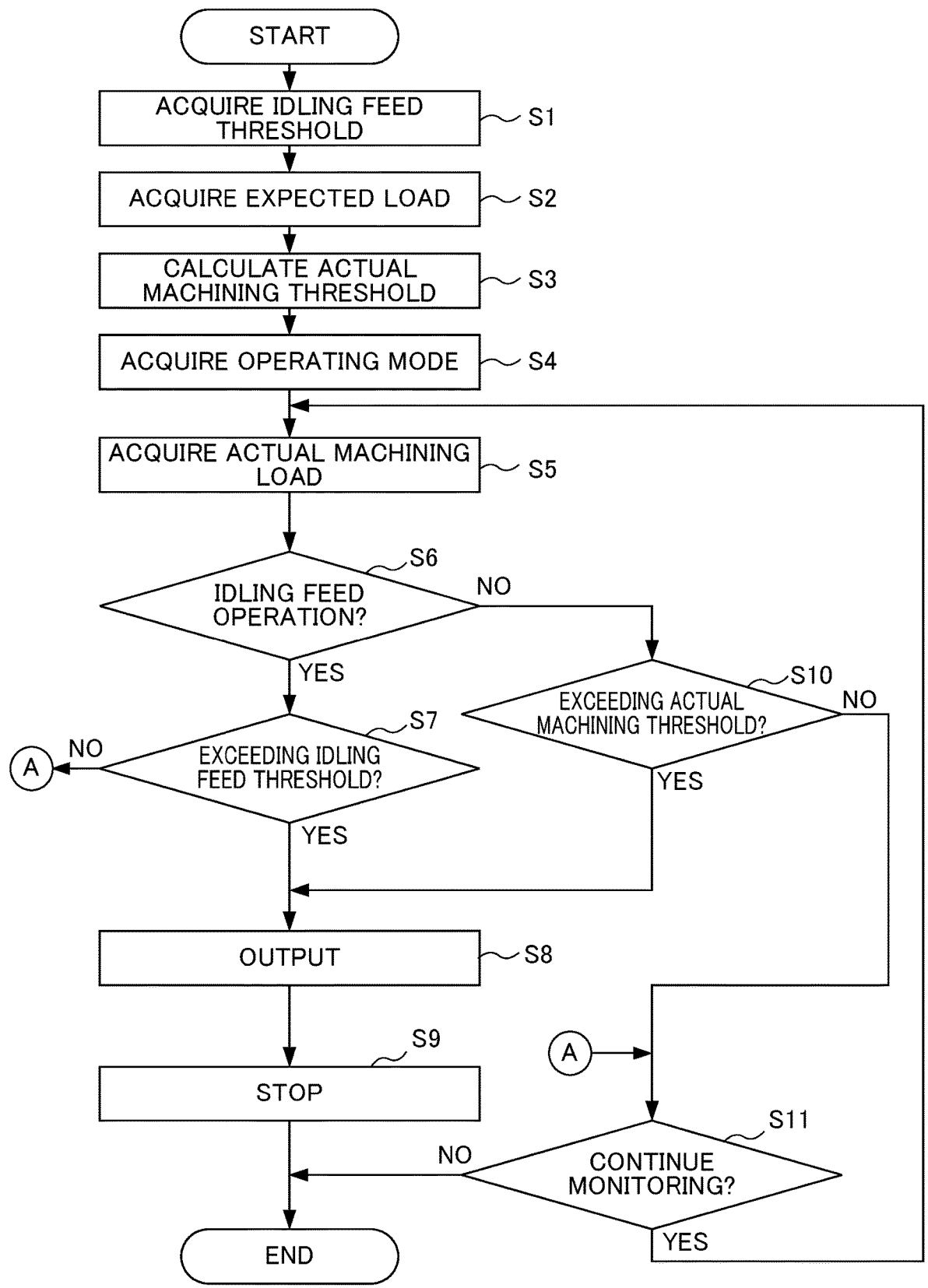
FIG. 4 is a flowchart showing an operation of the detection device according to the first embodiment.

Next, an operation of the detection device 1 will be described with reference to the flowchart in FIG. 4. First, the idling feed threshold acquiring unit 11 acquires an idling feed threshold (Step S1). The idling feed threshold acquiring unit 11 acquires, for example, a threshold of a load on the tool 102 in an idling feed operation set in the removal machining device 100. The idling feed threshold acquiring unit 11 sends the acquired idling feed threshold to the calculating unit 13 and the detecting unit 16.

Next, the expected load acquiring unit 12 acquires an expected load (Step S2). The expected load acquiring unit 12 acquires a different expected load according to, for example, the type of tool 102 or the type of removal machining. The expected load acquiring unit 12 sends the acquired expected load to the calculating unit 13.

Next, the calculating unit 13 calculates an actual machining threshold (Step S3). For example, the calculating unit 13 calculates the sum of the idling feed threshold and the expected load as the actual machining threshold. The calculating unit 13 sends the calculated actual machining threshold to the detecting unit 16.

Next, the operating mode acquiring unit 14 acquires an operating mode (Step S4). For example, the operating mode acquiring unit acquires whether the operating mode is an idling feed operation or an actual machining operation. The operating mode acquiring unit 14 sends the acquired operating mode to the detecting unit 16.

Next, the actual machining load acquiring unit 15 acquires an actual machining load (Step S5). The actual machining load acquiring unit 15 sends the acquired actual machining load to the detecting unit 16.

Next, the detecting unit 16 determines which operating mode the device is operating in (Step S6). If the operating mode is determined to be the idling feed operation (Step S6: YES), the process flow advances to Step S7. On the other hand, if the operating mode is determined to be the actual machining operation (Step S6: NO), the process flow advances to Step S10.

At Step S7, the detecting unit 16 determines whether the actual machining load exceeds the idling feed threshold. The detecting unit 16 detects, for example, an excess of the actual machining load relative to the idling feed threshold, as shown in FIG. 3. If the actual machining load exceeds the idling feed threshold (Step S7: YES), the process flow advances to Step S8. On the other hand, if the actual machining load does not exceed the idling feed threshold (Step S7: NO), the process flow advances to Step S11.

At Step S8, the output unit 17 outputs a signal indicating the excess of the actual machining load to the outside. For example, the output unit 17 causes a display device to display an indication of the excess of the actual machining load.

At Step S9, the stop control unit 18 stops operation of the removal machining device 100. This concludes the processing according to the present process flow.

At Step S10, the detecting unit 16 determines whether the actual machining load exceeds the actual machining threshold. The detecting unit 16 detects, for example, an excess of the actual machining load relative to the actual machining threshold, as shown in FIG. 3. If the actual machining load exceeds the actual machining threshold (Step S10: YES), the process flow advances to Step S8. On the other hand, if the actual machining load does not exceed the actual machining threshold (Step S10: NO), the process flow advances to Step S11.

At Step S11, it is determined whether or not to continue monitoring by the detection device 1. For example, if removal machining feed by the removal machining device 100 is performed continuously, monitoring by the detection device 1 is continued. If monitoring is to be continued (Step S11: YES), the process flow returns to Step S5. On the other hand, if monitoring is to be ended (Step S11: NO), processing according to the present process flow ends.

Next, the program will be described. Each of the configurations included in the detection device 1 may be realized by hardware, software, or a combination thereof. The expression "realized by software" as used here means to be realized by a computer reading and executing a program.

The program may be stored using a variety of non-transitory computer readable media and provided to the computer. Non-transitory computer readable media include various types of tangible storage media. Examples of non-transitory computer readable storage media include magnetic storage media (e.g., flexible disks, magnetic tapes, hard disk drives), magneto-optical storage media (e.g., magneto-optical discs), CD-ROM (Read Only Memory), CD-R, CD-R/W, and semiconductor memories (e.g., mask ROM, PROM (Programmable ROM), EPROM (Erasable PROM), flash ROM, RAM (random access memory)). Alternatively, the display program may be provided to the computer by various types of transitory computer readable media. Examples of transitory computer readable media include electric signals, optical signals, and electromagnetic waves. Transitory computer readable media can provide the program to the computer via a wired communication path such as electric wires and optical fibers, etc., or via a wireless communication path.

The detection device 1 and program according to the first embodiment described above exhibit the following effects.

(1) A detection device 1 to detect an abnormality in a removal machining load on a feed axis in a removal machining feed by a removal machining device 100, the detection device including: an idling feed threshold acquiring unit 11 that acquires, as an idling feed threshold, a threshold of an acceptable load in an idling feed operation where a workpiece 101 is not machined; an expected load acquiring unit 12 that acquires, as an expected load, an expected increase in load due to execution of an actual machining operation in which the workpiece 101 is actually machined; a calculating unit 13 that calculates, based on the idling feed threshold and the expected load, an actual machining threshold which is a threshold of an acceptable load in the actual machining operation; an operating mode acquiring unit 14 that acquires whether the operating mode is an idling feed operation or an actual machining operation; an actual machining load acquiring unit 15 that acquires, as an actual machining load, an actual load during an actual machining operation; a detecting unit 16 that detects, based on the operating mode, an excess of the actual machining load relative to the idling feed threshold or the actual machining threshold; and an output unit 17 that outputs a signal indicating the excess of the actual machining load. The threshold for detecting an abnormality can be changed between the idling feed operation where no removal machining load occurs and the actual machining operation. In other words, the threshold to be used can be changed according to the operating conditions. This makes it possible to prevent damage to the tool 102 in a more suitable manner according to the operating conditions.

(2) The calculating unit 13 calculates the sum of the idling feed threshold and the expected load as the actual machining threshold. This allows the detecting unit 16 to detect unintended contact of the tool 102 based on the actual machining threshold in which the load is increased compared to the idling feed threshold. It is thus possible to detect unintended contact of the tool 102 while preventing erroneous detection during actual removal machining by the removal machining device 100.

Second Embodiment

Figure 5:
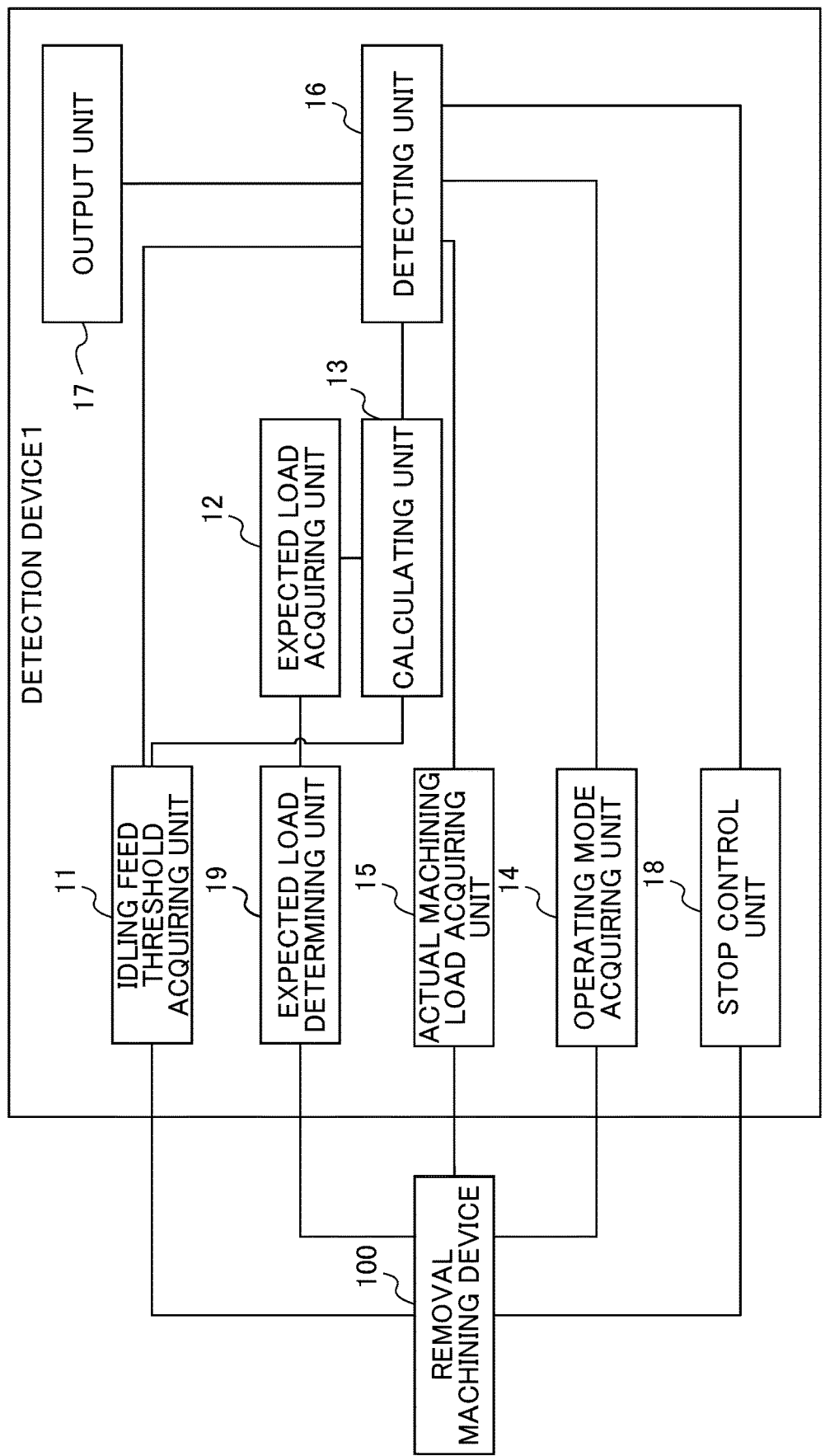
FIG. 5 is a block diagram showing a configuration of a detection device according to a second embodiment of the present disclosure.

Next, a detection device 1 and a program according to a second embodiment of the present disclosure is described with reference to FIGS. 5 to 9. In the description of the second embodiment, elements that are the same as in the embodiment described above are given the same reference numerals, and their descriptions will be omitted or simplified. The detection device 1 according to the second embodiment differs from the first embodiment in that it further includes a load determining unit 19, as shown in FIG. 5. The detection device 1 according to the second embodiment also differs from the first embodiment in that the expected load acquiring unit 12 acquires an expected load determined by the load determining unit 19.

The load determining unit 19 is realized, for example, by the operation of a CPU. The load determining unit 19 determines the expected load according to the type of tool 102 or type of removal machining. As shown in FIG. 6, the load determining unit 19 changes the expected load according to, for example, hardness of the workpiece 101, tensile strength of the workpiece 101, the feed rate, the depth of cut and removal machining width in the machining conditions, cutting speed, and shape of the tool 102. The load determining unit 19 changes the expected load using each of these elements as described below.

(Material of the Workpiece 101)

The load determining unit 19 increases the expected load if the hardness of the material of the workpiece 101 is high. In addition, the load determining unit 19 increases the expected load if the tensile strength of the material of the workpiece 101 is high.

(Feed Rate)

The load determining unit 19 increases the expected load the higher the feed rate. This is because the higher the feed rate, the greater the removal machining amount with each blade strike.

(Machining Conditions)

Figure 7:
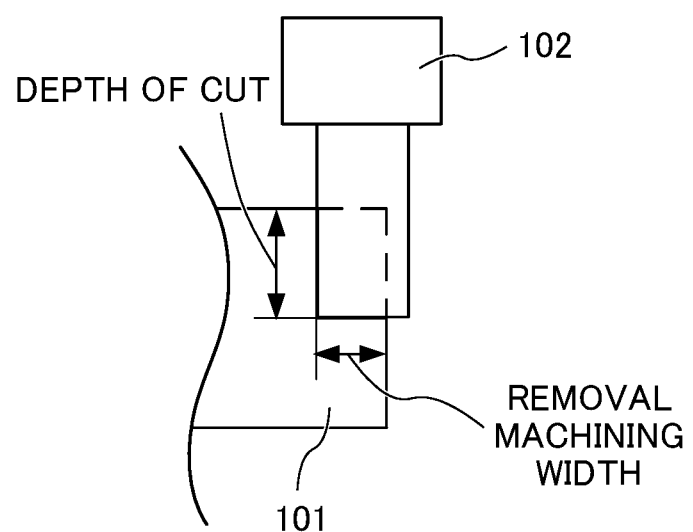
FIG. 7 is a conceptual illustration showing a depth of cut and a removal machining width according to the second embodiment.

The load determining unit 19 increases the expected load the greater the depth of cut shown in FIG. 7. In addition, the load determining unit 19 increases the expected load the greater the removal machining width shown in FIG. 7. This is because the greater the depth of cut or removal machining width, the greater the removal machining amount and greater the load.

(Cutting Speed)

The load determining unit 19 increases the expected load the slower the cutting speed. This is because as the cutting speed becomes slower, the removal machining amount with each blade strike increases, and the load becomes greater.

(Shape of the Tool 102)

Figure 8:
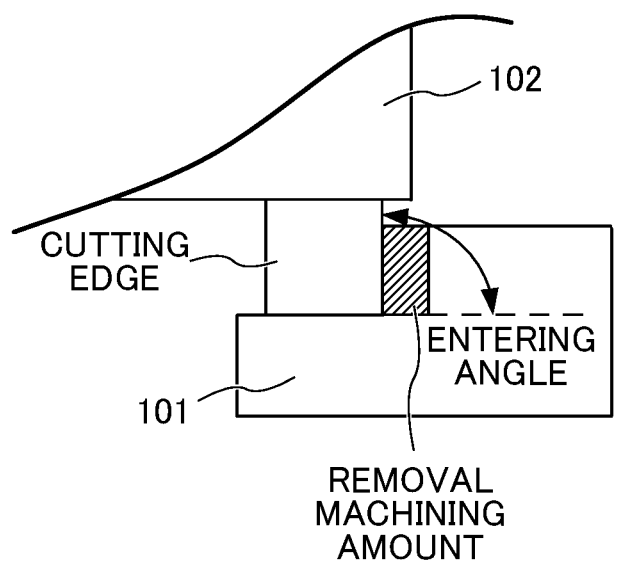
FIG. 8 is a conceptual illustration showing a relationship between a cutting edge, entering angle, and removal machining amount according to the second embodiment.
Figure 9:
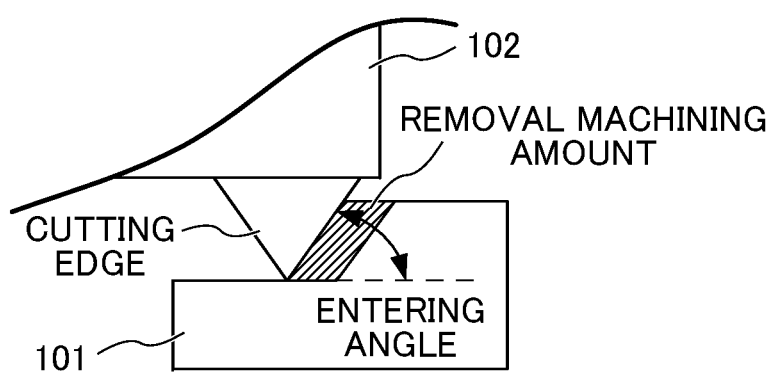
FIG. 9 is a conceptual illustration showing another relationship between the cutting edge, entering angle, and removal machining amount according to the second embodiment.

If the tool 102 is a milling cutter, the load determining unit 19, as shown in FIGS. 8 and 9, increases the expected load the smaller the entering angle. This is because the smaller the entering angle, the greater the removal machining amount with each blade strike and the greater the load.

The detection device 1 and program according to the second embodiment described above exhibit the following effects.

(3) The detection device further includes a load determining unit 19 that determines an expected load according to the type of tool 102 or type of removal machining, and the expected load acquiring unit 12 acquires the expected load determined by the load determining unit 19. This makes it possible to set a different expected load according to the type of tool 102 or type of removal machining, allowing for more flexible setting of the detection precision.

Preferred embodiments of the detection device and program according to the present disclosure have been described above, but the present disclosure is not limited to the above embodiments and may be modified as required. For example, in the above embodiments, the calculating unit 13 calculates the actual machining threshold even in a case of an idling feed operation, but the invention is not so limited. For example, the calculating unit 13 does not have to calculate the actual machining threshold. This may reduce the processing load of the detection device 1.

In the above embodiments, the stop control unit 18 stops the removal machining device 100, but the invention is not so limited. The stop control unit 18 may be omitted from the detection device 1. In this case, the detecting unit 16 only executes signal output by the output unit 17.

EXPLANATION OF REFERENCE NUMERALS 1 detection device
11 idling feed threshold acquiring unit
12 expected load acquiring unit
13 calculating unit
14 operating mode acquiring unit
15 actual machining load acquiring unit
16 detecting unit
17 output unit
100 removal machining device
101 workpiece
102 tool

What is claimed is:

1. A detection device to detect an abnormality in a removal machining load on a feed axis in a removal machining feed by a removal machining device, the detection device comprising:
   an idling feed threshold acquiring unit configured to acquire, as an idling feed threshold, a threshold of an acceptable load in an idling feed operation where a workpiece is not machined;
   an expected load acquiring unit configured to acquire, as an expected load, an expected increase in load due to execution of an actual machining operation in which the workpiece is actually machined;
   a calculating unit configured to calculate, based on the idling feed threshold and the expected load, an actual machining threshold, which is a threshold of an acceptable load in an actual machining operation;
   an operating mode acquiring unit configured to acquire whether the operating mode is an idling feed operation or an actual machining operation;
   an actual machining load acquiring unit configured to acquire, as an actual machining load, an actual load during an actual machining operation;
   a detecting unit configured to detect, based on the operating mode, an excess of the actual machining load relative to the idling feed threshold or the actual machining threshold; and
   an output unit configured to output a signal indicating the excess of the actual machining load.

2. The detection device according to claim 1, wherein the calculating unit calculates a sum of the idling feed threshold and the expected load as the actual machining threshold.

3. The detection device according to claim 1, further comprising a load determining unit configured to determine the expected load according to a type of the tool or a type of removal machining,
   wherein the expected load acquiring unit acquires the expected load determined by the load determining unit.

4. A storage medium storing a program to cause a computer to operate as a detection device to detect an abnormality in a removal machining load on a feed axis in a removal machining feed by a removal machining device, the program causing the computer to function as:
- an idling feed threshold acquiring unit configured to acquire, as an idling feed threshold, a threshold of an acceptable load in an idling feed operation where a workpiece is not machined;
- an expected load acquiring unit configured to acquire, as an expected load, an expected increase in load due to execution of an actual machining operation in which the workpiece is actually machined;
- a calculating unit configured to calculate, based on the idling feed threshold and the expected load, an actual machining threshold, which is a threshold of an acceptable load in an actual machining operation;
- an operating mode acquiring unit configured to acquire whether the operating mode is an idling feed operation or an actual machining operation;
- an actual machining load acquiring unit configured to acquire, as an actual machining load, an actual load during an actual machining operation;
- a detecting unit configured to detect, based on the operating mode, an excess of the actual machining load relative to the idling feed threshold or the actual machining threshold; and
- an output unit configured to output a signal indicating the excess of the actual machining load.

* * * * *